(12) United States Patent
Kajala et al.

(10) Patent No.: US 11,330,151 B2
(45) Date of Patent: May 10, 2022

(54) SELECTING A TYPE OF SYNCHRONIZATION

(71) Applicant: Nokia Technologies Oy, Espoo (FI)

(72) Inventors: Matti Kajala, Tampere (FI); Antero Tossavainen, Helsinki (FI); Mikko Olavi Heikkinen, Tampere (FI); Miikka Tapani Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/845,580

(22) Filed: Apr. 10, 2020

(65) Prior Publication Data
US 2020/0336624 A1    Oct. 22, 2020

(30) Foreign Application Priority Data

Apr. 16, 2019  (EP) .................................... 19169526

(51) Int. Cl.
*H04N 5/067*  (2006.01)

(52) U.S. Cl.
CPC .................................. *H04N 5/067* (2013.01)

(58) Field of Classification Search
CPC .. H04N 5/067; H04N 9/802; H04N 21/43074; H04N 5/04; H04N 5/23296; H04N 21/8106; H04N 21/4318; H04N 21/4394; H04N 21/44008
USPC ....................................................... 348/512
See application file for complete search history.

(56) References Cited

U.S. PATENT DOCUMENTS

| | | | |
|---|---|---|---|
| 8,640,181 B1 | 1/2014 | Inzerillo | |
| 8,913,189 B1* | 12/2014 | Mincher | H04N 21/4394 348/515 |
| 2007/0127879 A1* | 6/2007 | Frank | H04N 21/44008 386/234 |
| 2007/0223874 A1* | 9/2007 | Hentschel | H04N 21/44008 386/203 |
| 2008/0263612 A1* | 10/2008 | Cooper | H04N 5/04 725/116 |
| 2009/0207277 A1 | 8/2009 | Kurihara et al. | |

(Continued)

FOREIGN PATENT DOCUMENTS

| | | |
|---|---|---|
| CN | 103581606 A | 2/2014 |
| EP | 3340614 A1 | 6/2018 |

(Continued)

OTHER PUBLICATIONS

Thenmozhi et al., "Performance Analysis of Audio and Video Synchronization Using Spreaded Code Delay Measurement Technique", Int. J. Advanced Networking and Applications, vol. 10, No. 1, 2018, pp. 3728-3734.

(Continued)

*Primary Examiner* — Michael Lee
(74) *Attorney, Agent, or Firm* — Harrington & Smith

(57) ABSTRACT

An apparatus, method and computer program product for receiving captured visual information comprising a representation of an object, receiving captured audio information associated with the object, determining a user awareness parameter indicating a level of user comprehension of a context of capturing the visual information and the audio information and selecting, based on the user awareness parameter, a type of synchronization of the captured audio information with respect to the captured visual information.

20 Claims, 4 Drawing Sheets

(56) References Cited

U.S. PATENT DOCUMENTS

| | | |
|---|---|---|
| 2010/0245624 A1 | 9/2010 | Beaucoup |
| 2011/0181776 A1* | 7/2011 | Mallinson ................ H04N 5/04 |
| | | 348/515 |
| 2013/0141643 A1* | 6/2013 | Carson ............... H04N 21/4307 |
| | | 348/515 |
| 2015/0049248 A1* | 2/2015 | Wang ................ H04N 21/6437 |
| | | 348/512 |
| 2015/0093096 A1* | 4/2015 | Mishra ............... H04N 21/4307 |
| | | 386/241 |
| 2016/0286260 A1* | 9/2016 | Lawrence .......... H04N 21/4307 |
| 2016/0316108 A1* | 10/2016 | Cooper .................... H04N 5/04 |
| 2018/0158922 A1* | 6/2018 | Marck ...................... H04N 7/56 |
| 2020/0092442 A1* | 3/2020 | Keller .............. H04N 5/232121 |

FOREIGN PATENT DOCUMENTS

| | | |
|---|---|---|
| WO | 2009/047572 A1 | 4/2009 |
| WO | 2018/115228 A1 | 6/2018 |

OTHER PUBLICATIONS

Extended European Search Report received for corresponding European Patent Application No. 19169526.1, dated Sep. 19, 2019, 8 pages.

\* cited by examiner

SELECTING A TYPE OF SYNCHRONIZATION

TECHNICAL FIELD

The present application relates generally to selecting a type of synchronization. More specifically, the present application relates to selecting a type of synchronization of captured audio information with respect to captured visual information.

BACKGROUND

The amount of multimedia content increases continuously. Users create and consume multimedia content, and it has a big role in modern society.

SUMMARY

Various aspects of examples of the invention are set out in the claims.

According to a first aspect of the invention, there is provided an apparatus comprising means for performing: receiving captured visual information comprising a representation of an object, receiving captured audio information associated with the object, determining a user awareness parameter indicating a level of user comprehension of a context of capturing the visual information and the audio information and selecting, based on the user awareness parameter, a type of synchronization of the captured audio information with respect to the captured visual information.

According to a second aspect of the invention, there is provided a method comprising: receiving captured visual information comprising a representation of an object, receiving captured audio information associated with the object, determining a user awareness parameter indicating a level of user comprehension of a context of capturing the visual information and the audio information and selecting, based on the user awareness parameter, a type of synchronization of the captured audio information with respect to the captured visual information.

According to a third aspect of the invention, there is provided a computer program comprising instructions for causing an apparatus to perform at least the following: receiving captured visual information comprising a representation of an object, receiving captured audio information associated with the object, determining a user awareness parameter indicating a level of user comprehension of a context of capturing the visual information and the audio information and selecting, based on the user awareness parameter, a type of synchronization of the captured audio information with respect to the captured visual information.

According to a fourth aspect of the invention, there is provided an apparatus comprising at least one processor and at least one memory including computer program code, the at least one memory and the computer program code configured to with the at least one processor, cause the apparatus at least to perform: receive captured visual information comprising a representation of an object, receive captured audio information associated with the object, determine a user awareness parameter indicating a level of user comprehension of a context of capturing the visual information and the audio information and select, based on the user awareness parameter, a type of synchronization of the captured audio information with respect to the captured visual information.

According to a fifth aspect of the invention, there is provided a non-transitory computer readable medium comprising program instructions for causing an apparatus to perform at least the following: receiving captured visual information comprising a representation of an object, receiving captured audio information associated with the object, determining a user awareness parameter indicating a level of user comprehension of a context of capturing the visual information and the audio information and selecting, based on the user awareness parameter, a type of synchronization of the captured audio information with respect to the captured visual information.

According to a sixth aspect of the invention, there is provided a computer readable medium comprising program instructions for causing an apparatus to perform at least the following: receiving captured visual information comprising a representation of an object, receiving captured audio information associated with the object, determining a user awareness parameter indicating a level of user comprehension of a context of capturing the visual information and the audio information and selecting, based on the user awareness parameter, a type of synchronization of the captured audio information with respect to the captured visual information.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to selecting, based on a user awareness parameter, a type of synchronization of captured audio information with respect to captured visual information. The user awareness parameter indicates a level of user comprehension of a context of capturing the audio information and the visual information.

According to an example embodiment, an apparatus is configured to receive captured visual information comprising a representation of an object and captured audio information associated with the object. The visual information may comprise, for example, a video comprising the object and the audio information may comprise audio provided by the object. The audio information and the visual information may be captured by the apparatus or a separate capturing device. The apparatus is configured to determine a user awareness parameter indicating a level of user comprehension of a context of capturing the visual information and the audio information. The apparatus is configured to select, based on the user awareness parameter, a type of synchronization of the captured audio information with respect to the captured visual information.

Figure 1:
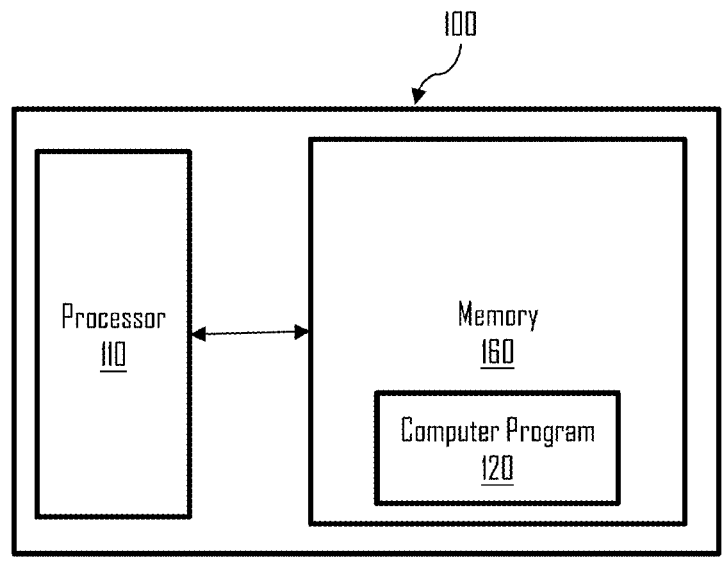
FIG. 1 shows a block diagram of an example apparatus in which examples of the disclosed embodiments may be applied.

FIG. 1 is a block diagram depicting an apparatus 100 operating in accordance with an example embodiment of the invention. The apparatus 100 may be, for example, an electronic device such as a chip or a chip-set. The apparatus 100 includes a processor 110 and a memory 160. In other examples, the apparatus 100 may comprise multiple processors.

In the example of FIG. 1, the processor 110 is a control unit operatively connected to read from and write to the memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus.

The memory 160 stores computer program code 120 which when loaded into the processor 110 control the operation of the apparatus 100 as explained below. In other examples, the apparatus 100 may comprise more than one memory 160 or different kinds of storage devices.

Computer program code 120 for enabling implementations of example embodiments of the invention or a part of such computer program instructions may be loaded onto the apparatus 100 by the manufacturer of the apparatus 100, by a user of the apparatus 100, or by the apparatus 100 itself based on a download program, or the instructions can be pushed to the apparatus 100 by an external device. The computer program instructions may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
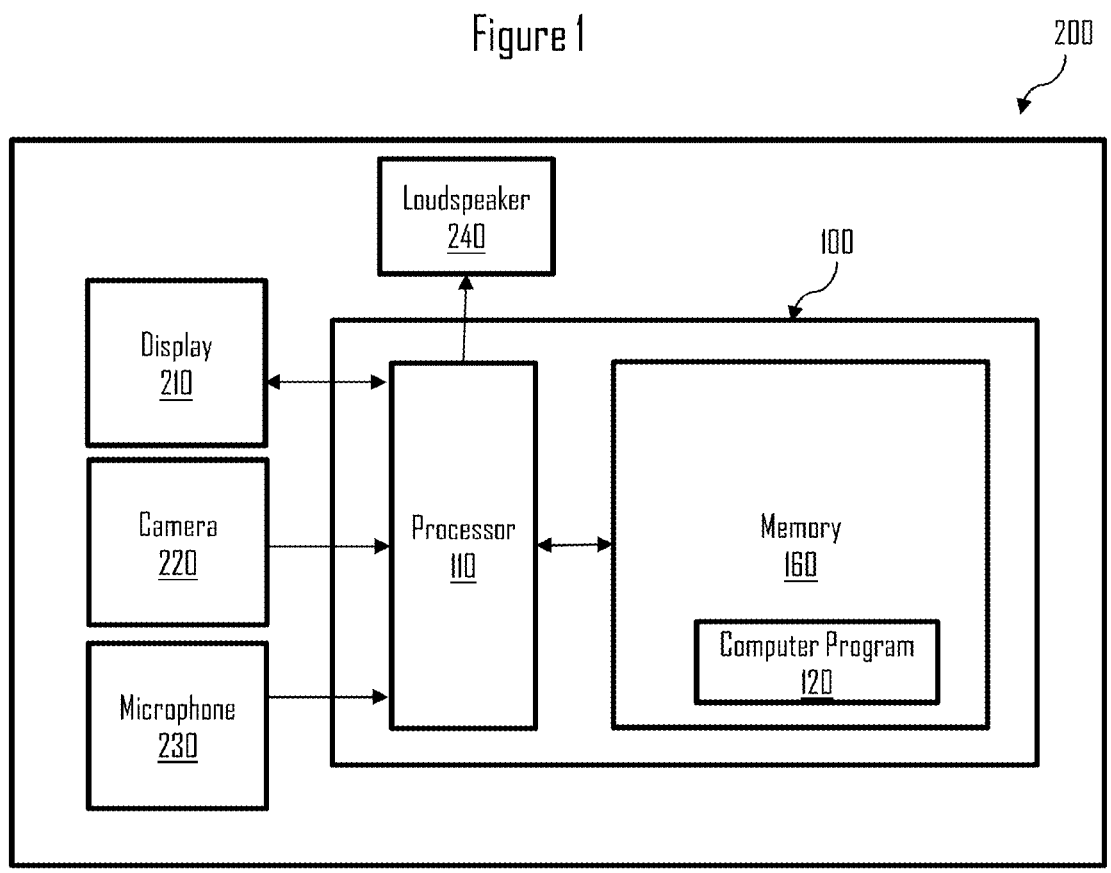
FIG. 2 shows a block diagram of another example apparatus in which examples of the disclosed embodiments may be applied.

FIG. 2 is a block diagram depicting an apparatus 200 in accordance with an example embodiment of the invention. The apparatus 200 may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a CD-, DVD or Blu-ray player, or a media player. In the examples below it is assumed that the apparatus 200 is a mobile computing device or part of it.

In the example embodiment of FIG. 2, the apparatus 200 is illustrated as comprising the apparatus 100, a display 210, a camera 220, a microphone 230 and a loudspeaker 240. The apparatus 200 also comprises a user interface for interacting with the apparatus 200. In the example of FIG. 2, the display 210 is also configured to act as a user interface. For example, the display may be a touch screen display. In an example embodiment, the display 210 and/or the user interface may be external to the apparatus 200, but in communication with it.

Additionally or alternatively, the user interface may also comprise a manually operable control such as a button, a key, a touch pad, a joystick, a stylus, a pen, a roller, a rocker, a keypad, a keyboard or any suitable input mechanism for inputting and/or accessing information. Further examples include a speech recognition system, eye movement recognition system, acceleration-, tilt- and/or movement-based input systems. Therefore, the apparatus 200 may also comprise different kinds of sensors such as one or more gyro sensors, accelerometers, magnetometers, position sensors and/or tilt sensors.

The apparatus 200 of the example of FIG. 2 may also be configured to establish radio communication with another device using, for example, a Bluetooth, WiFi, radio frequency identification (RFID), or a near field communication (NFC) connection.

According to an example embodiment, the apparatus 200 is configured to receive captured visual information comprising a representation of an object. The captured visual information may comprise, for example, video information captured by a capturing device such as a camera 220 or a separate camera in communication with the apparatus 200. The visual information may be received, for example, by capturing the visual information by the apparatus 200, by receiving the visual information from a network or another device or by loading the visual information from a memory card.

The apparatus 200 is further configured to receive captured audio information associated with the object. The captured audio information may comprise, for example, audio information captured by a capturing device such as a microphone 230 or a separate microphone in communication with the apparatus 200. Audio information may comprise, for example, a sound provided, created, generated or caused by an animate or inanimate object. The audio information may be received, for example, by capturing the audio information by the apparatus 200, by receiving the audio information from a network or another device, or by loading the audio information from a memory card.

According to an example embodiment, the apparatus 200 comprises at least one of a camera 220 or a microphone 230.

According to an example embodiment, the visual information and the audio information are captured at a first point in time. Capturing the visual information and the audio information may comprise starting recording a video by the camera 220 and the microphone 230. Captured visual information may comprise video frames associated with a time of capture or a time stamp. Captured audio information may comprise audio frames associated with a time of capture or a time stamp. A time of capture may be determined, for example, using a device clock and/or information from device camera and device microphone.

Even though the visual information and the audio information are captured at the same point in time, there may be a delay between the visual information and the audio information. Audio travels at the speed of sound, which is approximately 340 meters per second. However, the speed of sound depends upon temperature and which gases exist in the medium through which a soundwave is propagating. The theoretical value for the speed of sound at 20° C. is about 343 meters per second. On the other hand, visual information travels at the speed of light that is approximately 300000000 meters per second. Therefore, visual information is typically received at a capturing device nearly instantaneously. A long distance between an object that a capturing device may affect how the user perceives captured content. For example, when a user captures video information comprising a representation of an object and audio information produced by the object and the distance between the capturing device and the object is long, the user may notice that the audio is received by the capturing device later than the visual information. This is due to the difference between the travelling speed of visual information and the travelling speed of audio information. Due to the difference between travelling times, it may seem when viewing a playback of the video that the sound comes too late. However, if the distance between the capturing device and the object is short, there is still delay between the visual information and the audio information, but it may be unnoticeable for a user. The delay caused by the different travelling times may be determined by dividing the distance between the object and the capturing device by the speed of sound. For example, if a user captures a video of a space rocket that is 10 km away from the capturing device, the delay between received visual information and audio information is about 30 seconds. Significant delays between audio and visual information may also occur when capturing a video of, for example, fireworks, car races or air shows. If a user viewing the video does not comprehend the context of capturing the visual information and the audio information, it may be difficult for a person viewing the video to understand why there is a delay between the visual information and the audio information. The user might not comprehend the reason for the delay, if the user is not aware of the context of capturing the visual information and the audio information. In addition, if the delay between the audio information and the visual information is longer that the duration of the captured video, the audio is not present on the video at all.

According to an example embodiment, audio information associated with an object comprises audio information caused, created, generated or provided by the object.

The apparatus 200 of FIG. 2 is configured to determine a user awareness parameter indicating a level of user comprehension of a context of capturing the visual information and the audio information. The user awareness parameter may be determined based on information relating to the user and/or information relating to capturing the visual information and the audio information.

Information relating to the user may comprise, for example, contextual information, information on user behaviour, information on user preferences, information on circumstances of the user, or a combination thereof. Information relating to the user may be detected, monitored and/or measured by the apparatus 200 or received, for example, from a separate apparatus.

Information relating to capturing the visual information and the audio information may comprise, for example, contextual information, information on used parameters or settings in the camera, information on properties of camera, information on capturing circumstances or any combination thereof. Information relating to capturing the visual information may be detected, monitored and/or measured by the apparatus 200 or received, for example, from a separate apparatus.

According to an example embodiment, a user awareness parameter indicating a level of user comprehension comprises a parameter value that indicates a first level of comprehension or a second level of comprehension. The first level of comprehension may comprise a low level of comprehension and the second level of comprehension may comprise a high level of comprehension. A low level of comprehension may comprise a level that is below a threshold value and a high level of comprehension may comprise a level that is above a threshold value. A first level of comprehension may indicate that the user comprehends the context of capturing the visual information and the audio information, and a second level of comprehension may indicate that the user does not comprehend the context.

According to another example embodiment, a level of user comprehension comprises a TRUE or FALSE value. For example, TRUE might indicate that the user comprehends the context of capturing the visual information and the audio information, while FALSE might indicate that the user does not comprehend the context. In other words, the user awareness parameter may indicate that a user does or does not comprehend the context of capturing.

In general, contextual information may comprise information that gives context, for example, to a person, entity or event. For example, contextual information relating to an event may comprise a geographical location, a date, a time of day, circumstances, a characteristic or any other suitable piece of information. As another example, contextual information relating to a user may comprise, for example, a location of the user, an action involving the user and/or determining a way the user consumes the visual information and the audio information.

According to an example embodiment, determining a user awareness parameter comprises comparing first contextual information with second contextual information. The first contextual information may comprise, for example, contextual information relating to capturing the visual information and the audio information. The second contextual information may comprise, for example, contextual information relating to consuming the visual information and the audio information. Consuming the captured visual information and the audio information may comprise, for example, viewing the visual information, listening to the audio information or a combination thereof.

The first contextual information may comprise a location of capturing the audio information and the visual information and the second contextual information may comprise a location of the user. According to an example embodiment, the user awareness parameter is determined based on a location of the user. A location of the user may comprise, for example, a location of the user at the time of capturing the visual information and the audio information, a location before consuming the visual information and the audio information, or a location of the user at the time of consuming the visual information and the audio information. A location of the user may be detected, for example, by a device that the user carries, for example, based on GPS coordinates (Global Positioning System), a wireless network detected/connected by the device or any other suitable method.

According to an example embodiment, the apparatus 200 is configured to compare the geographical location of the user with the location of capturing the visual information and the audio information. In this way, it may be determined whether the user has been close to the capturing device at the time capturing, for example. Alternatively, it may be detected whether the user has previously visited the location and hence is familiar with the circumstances of the capturing location.

According to an example embodiment, the user awareness parameter is determined based on an action involving the user. An action involving the user may comprise a communication such as a phone call, a message such as a text message, a chat message or an email, or activity in social media. Based on the action involving the user, it may be detected that the user has been in communication with a person capturing the visual information and the audio information. According to an example embodiment, the apparatus 200 is configured determine the content of the communication. Determining the content of the communication may comprise, for example, analyzing the content using speech recognition software and/or text recognition software. In this way, it may be detected whether the person capturing the visual information and the audio information has informed the user about the context of capturing the visual information and the audio information.

According to an example embodiment, the user awareness parameter is determined based on a capturing parameter. In an example embodiment, the capturing parameter may relate to a parameter of a capturing device. The capturing parameter may comprise, for example, a lens angle or a user configurable setting in the capturing device. In an example embodiment, the apparatus 200 is configured to receive information on a lens angle of the capturing device. In another example, the apparatus 200 is configured to receive information on whether a lens angle is above or below a threshold value. For example, the apparatus 200 may be configured to receive information on whether the lens angle is wider than, for example, 50 mm. If the lens angle is wide, it means that the captured view is not zoomed in. In such a situation, the user can comprehend the context of capturing, because the real surroundings of the object are visible. If the user understands based on the context that the object is far away, the user may also expect that there is a delay between the captured visual information and audio information. On the other hand, if the captured view is zoomed in, the user might not comprehend the context of capturing and assume that the object is close, even though it is far away. In such a situation, the user might not comprehend the context and wonder why there is a delay between the captured visual information and the audio information.

In another example embodiment, the capturing parameter may relate to a characteristic of the captured audio information and/or the captured visual information. A characteristic of the captured audio information and/or the captured visual information may comprise, for example, a duration of the captured audio information and/or a duration of the captured visual information, respectively.

According to an example embodiment, the apparatus 200 is configured to receive information on a duration of the captured visual information and compare the duration of captured the visual information with a threshold value. The apparatus 200 is further configured to determine the user awareness parameter based on the comparison and select a type of synchronization based on the user awareness parameter. According to an example embodiment, the threshold value comprises a delay between the captured visual information and the captured audio information. For example, if the duration of the captured visual information is shorter than the delay between the captured visual information and the captured audio information, the user might not comprehend the context of capturing, because upon playback of the captured visual information, the audio information may be missing. However, if the duration of the captured visual information is longer than the delay, it may be assumed that the user comprehends the context of capturing.

According to an example embodiment, the apparatus 200 is configured to determine the user awareness parameter based on a location of the user, an action involving the user and/or a capturing parameter.

According to an example embodiment, the user awareness parameter may depend upon the context of the viewer. For example, the user awareness parameter may comprise a first parameter when a user views a playback of a video and a second parameter when the user views a streaming of a video. According to another example embodiment, the user awareness parameter may be different for different users.

Without limiting the scope of the claims, an advantage of determining the user awareness parameter is that it may be estimated whether the user comprehends the context of capturing the visual information and the audio information. Another advantage may be that customized content may be provided for a user based on the user's level of comprehension of the capturing the visual information and the audio information.

According to an example embodiment, a context of capturing the visual information and the audio information comprises a distance between the object and a capturing device. According to an example embodiment, the capturing device comprises the apparatus 200.

According to an example embodiment, the apparatus 200 is configured to determine a distance between the object and the apparatus 200. The distance between the object and the apparatus 200 may be determined based on a camera focus distance of the camera 220, a depth map from the camera 220, a distance sensor such as a LED sensor or a laser, or any combination thereof.

According to an example embodiment, the user awareness parameter comprises a numerical value. The numerical value may be, for example, 0 or 1, or a value between 0 and 1. The numerical value may also be a bigger than 1 or smaller than 0. The user awareness parameter may indicate user awareness on a pre-determined scale, or it may be a true/false type of value.

According to an example embodiment, the apparatus 200 is further configured to select, based on the user awareness parameter, a type of synchronization of the captured audio information with respect to the captured visual information. Synchronization of the captured audio information with respect to the captured visual information comprises timing of the captured audio information with respect to the visual information. Timing of the captured audio information with respect to the visual information may relate to creation, post-production, transmission, reception or play-back processing of the captured information. Therefore, synchronization may comprise selecting a playback position for captured audio information with respect to captured visual information in different contexts.

Synchronizing the captured audio information with respect to the captured visual information comprises associating an audio frame with a video frame. Associating an audio frame with a video frame may be performed based on a time of capture associated with the audio frame and the time of capture associated with the video frame. Typically, an audio frame comprises 1024 audio samples combined into the audio frame. The number of audio samples in an audio frame may also be less than 1024 or more than 1024. For example, there may be one audio sample in an audio frame, thereby enabling performing synchronization of audio information an audio sample by an audio sample. As another example, different audio frames may comprise a different number of audio samples. As a further example, the number of audio samples comprised by an audio frame may depend on audio format or characteristics of a playback system. The time of capture associated with an audio frame may correspond to the time of capture of the first audio sample selected to the audio frame.

Without limiting the scope of the claims, an advantage of selecting a type of synchronization of captured audio information with respect to captured visual information based on a user awareness parameter is that a customized synchronization can be selected for a person consuming the content. Another advantage may be that different users may consume the content differently.

According to an example embodiment, a type of synchronization comprises a first type of synchronization or a second type of synchronization. The first type of synchronization may be different from the second type of synchronization. The first type of synchronization and the second type of synchronization may differ based on how a delay between the captured audio information and the captured visual information is handled. According to an example embodiment, the first type of synchronization comprises a default synchronization and the second type of synchronization comprises a modified synchronization.

According to an example embodiment, the apparatus 200 is configured to select the first type of synchronization, if it is determined based on the user awareness parameter that the user comprehends the context of capturing the visual information and the audio information. According to another example embodiment, the apparatus 200 is configured to select the second type of synchronization, if it is determined based on the user awareness parameter that the user does not comprehend the context of capturing the visual information and the audio information.

According to an example embodiment, the first type of synchronization comprises synchronizing the captured audio information with respect to the captured visual information based on a time of capture. For example, the first type of synchronizing may comprise selecting audio samples to an audio frame such that the time of capture of the first selected audio sample in the audio frame corresponds with the time of capture of the video frame. Synchronizing based on a time of capture keeps a possible delay between the audio information and the visual information. Synchronizing based on a time of capture may comprise a default synchronization.

According to an example embodiment, the second type of synchronization comprises adjusting a delay between the audio information and the visual information. Adjusting the delay may comprise, for example, modifying the length of the delay or removing the delay. Adjusting a delay between the audio information and the visual information may comprise selecting suitable audio samples to the audio frame. As another example, adjusting a delay between the audio information and the visual information may comprise selecting a suitable number of audio samples to the audio frame. For example, the apparatus 200 may be configured to determine a delay between the captured visual information and the captured audio information. The apparatus 200 may further be configured to remove the delay by selecting audio samples to the audio frame such that there is an offset corresponding to the length of the determined delay between the capture time of the video frame and the capture time of the first selected audio sample in the audio frame. The offset may also be less than the determined delay.

According to an example embodiment, the second type of synchronization comprises synchronizing the captured audio information with respect to the captured visual information in dependence upon the user awareness parameter. According to an example embodiment, synchronizing the captured audio information with respect to the captured visual information in dependence upon the user awareness parameter comprises modifying the synchronization with the user awareness parameter. Modifying the synchronization with the user awareness parameter may comprise performing different mathematical operations. In other words, in addition to selecting a type of synchronization, the user awareness parameter may be used for modifying the synchronization. For example, the apparatus 200 may be configured to adjust the delay between the captured audio information and the captured visual information based on the user awareness parameter. For example, in an example embodiment, the user awareness parameter may be used as a multiplier to adjust the length of the delay.

According to an example embodiment, the second type of synchronization comprises synchronizing a detected audio feature with respect to a detected visual feature. The apparatus 200 may be configured to analyze visual features of the captured visual content and audio features of the captured audio content. For example, the apparatus may be configured to detect rapid movements in the captured visual content and attacks in the captured audio content. The synchronization may be performed such that detected audio features are associated with detected visual features.

According to an example embodiment, the apparatus 200 is further configured to synchronize the captured audio information with respect to the captured visual information according to the selected type of synchronization.

According to an example embodiment, the apparatus 200 comprises means for performing the features of the claimed invention, wherein the means for performing comprises at least one processor 110, at least one memory 160 including computer program code 120, the at least one memory 160 and the computer program code 120 configured to, with the at least one processor 110, cause the performance of the apparatus 200.

Figure 3:
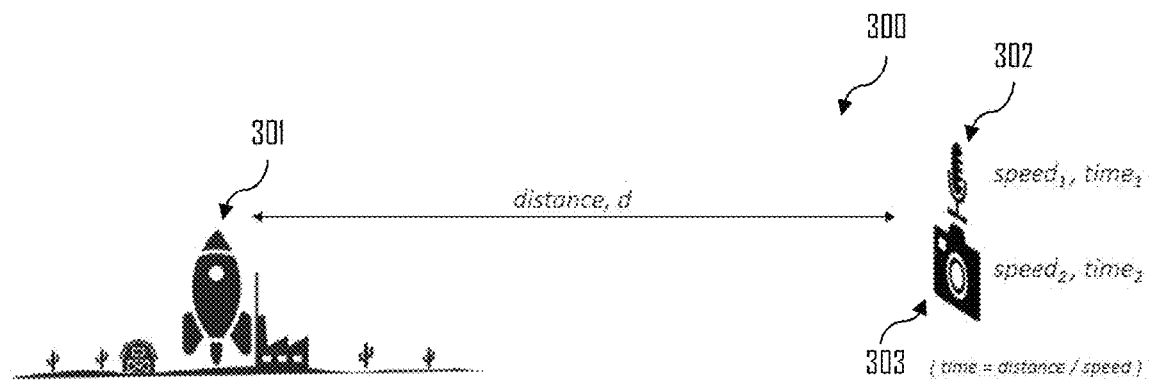
FIG. 3 illustrates an example situation of capturing visual information comprising a representation of an object and capturing audio information associated with the object.

FIG. 3 illustrates a situation 300 of capturing visual information comprising a representation of an object and capturing audio information associated with the object.

In the example of FIG. 3, a video is captured of a rocket 301 launch. The video comprises visual information and audio information. The video is captured using a capturing device comprising a microphone 302 and a camera 303. As mentioned earlier, audio information travels at the speed of sound (speed 1 in FIG. 3) and visual information travels at the speed of light (speed 2 in FIG. 3). Time for travelling the distance d may be determined by diving the distance d by the speed of travelling. As the speed of light is remarkably faster than the speed of sound, the travelling time for audio information (time 1 in FIG. 3) and the travelling time for visual information (time 2 in FIG. 3) may also differ remarkably. In the example of FIG. 3, as the distance between the capturing device and the rocket 301 is long, there may be a noticeable delay between the captured audio information and the captured visual information. The delay between the captured audio information and the captured visual information may be determined based on the difference between the travelling time for visual information (time 2) and the travelling time for audio information (time 1).

Figure 4:
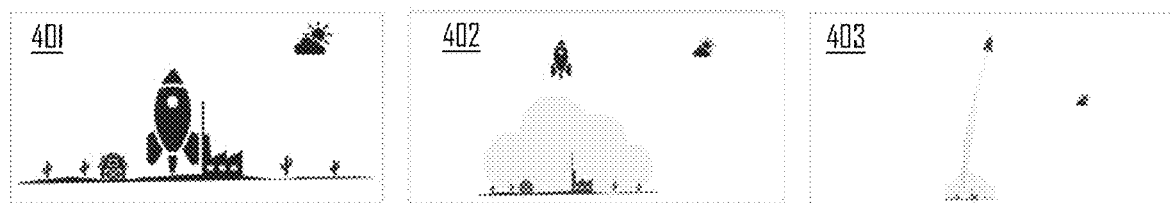
FIG. 4 illustrates example views of captured content.

In FIG. 4, there is illustrated how different capturing parameters affect the comprehension of the context of capturing. FIG. 4 illustrates example views 401, 402 and 403 of captured content. A view may comprise captured content presented to a user. In view 401 the captured content is zoomed in such that not much of the environment of the rocket is visible. Because the visible environment of the rocket is limited, it may appear to a user that the rocket is close to the capturing apparatus, even though it is far away. In view 402 the captured content is still zoomed in, but less than in view 401. In this situation the user may have a better comprehension of the context of capturing than, for example, in the situation of view 401. In view 403, the captured content is not zoomed in at all and the user probably have a full comprehension of the context of capturing.

Figure 5:
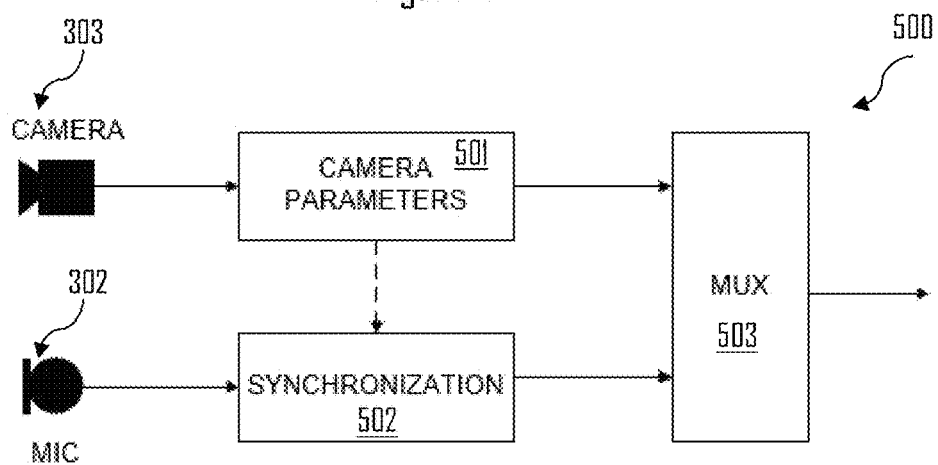
FIG. 5 shows a block diagram illustrating an example functionality of an example apparatus.

FIG. 5 illustrates an example block diagram 500 depicting selecting, based on a user awareness parameter, a type of synchronization of captured audio information with respect to captured visual information. The elements of FIG. 5 may be comprised by the apparatus 200. However, as mentioned earlier, the captured visual information and/or the captured audio information may also be received for a separate camera and/or a microphone in communication with the apparatus 200. The captured visual information is received from a camera 303 and the captured audio information is received from a microphone 302. In the example of FIG. 5, the user awareness parameter is determined based on a capturing parameter. In this example, the capturing parameter comprises at least one camera parameter 501, for example, zoom information. Zoom information indicates whether the visual information captured by the camera is zoomed in, zoomed out, or whether a zoom function is applied. Selecting a type of synchronization 502 comprises selecting one or more audio samples to an audio frame and associating the audio frame with a video frame. The audio samples may be selected based or in dependence upon the user awareness parameter. The visual information and the synchronized audio information are combined in a multiplexer (MUX) 503 which then forwards them into a single output line. Another example embodiment comprising synchronizing the captured audio information with respect to the captured visual information is illustrated in more detail in FIG. 6.

Figure 6:
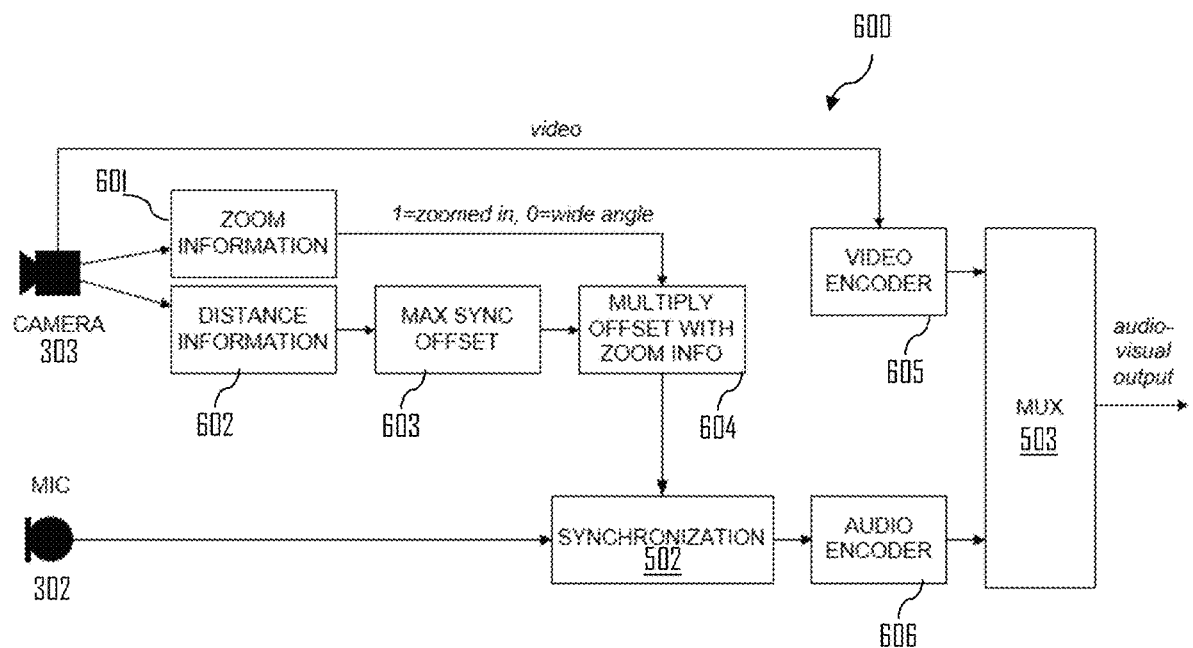
FIG. 6 shows another block diagram illustrating an example functionality of an example apparatus.

FIG. 6 illustrates another example block diagram 600 depicting selecting, based on a user awareness parameter, a type of synchronization of captured audio information with respect to the captured visual information. More specifically, the example embodiment of FIG. 6 illustrates selecting a type of synchronization of the captured audio information with respect to the captured visual information in dependence upon the user awareness parameter. The elements of FIG. 6 may be comprised by the apparatus 200. However, as mentioned earlier, the captured visual information and/or the captured audio information may also be received for a separate camera and/or a microphone in communication with the apparatus 200. FIG. 6 further illustrates synchronizing the captured audio information with respect to the captured visual information in dependence upon the user awareness parameter. Synchronizing the captured audio information with respect to the captured visual information in dependence upon the user awareness parameter comprises modifying the synchronization with the user awareness parameter.

Similarly to FIG. 5, the captured visual information is received from a camera 303 and the captured audio information is received from a microphone 302. In the example embodiment of FIG. 6, a user awareness parameter is determined based on capturing parameters such as zoom information 601 and distance information 602. In the example of FIG. 6, the distance information may be received from the camera 602. However, as mentioned earlier, the distance information may also be received from some other source, for example, a distance sensor. The zoom information 601 may comprise, for example, information on whether the captured visual information is zoomed in, zoomed out, how much the visual information is zoomed in, how much the visual information is zoomed out or whether a zoom function is applied. The distance information 602 comprises a distance between an object and the camera 303. The capturing parameters are received from the camera 303.

In the example of FIG. 6, the zoom information 601 indicates whether the captured visual information is zoomed in or whether the lens angle is wide. When the visual information is zoomed in, the user sees less surroundings of the object and hence might have a low level of comprehension of a context of capturing the visual information and the audio information. On the other hand, when the lens angle is wide, the user can see more of the surroundings of the object and hence might have a high level of comprehension of the context of capturing the visual information and the audio information. In this example, the context of capturing comprises the distance between the object and camera 303.

The user awareness parameter is determined based on zoom information and distance information. If the visual information is zoomed in, the user awareness parameter value is 1 and if the lens angle is wide, the user awareness parameter value is 0. The camera 303 is also configured to determine the distance between an object and the camera 303, for example, using a camera focus distance, a depth map or a distance sensor. Based on the determined distance a maximum synchronization offset 603 is determined. The maximum synchronization offset is determined by diving the distance between the object and the camera 303 by the speed of sound. In other words, the maximum synchronization offset 603 indicates how long a delay there can be between the audio information and the visual information when an object providing sound is captured. As mentioned above, if the distance between the object and the capturing device is long, the delay can also be long. As mentioned above, the user awareness parameter may be used for modifying the synchronization. In the example of FIG. 6, modifying the synchronization comprises adjusting the maximum synchronization offset with the user awareness parameter. Adjusting the maximum synchronization offset with the user awareness parameter may comprise performing different mathematical operations. In FIG. 6, the maximum synchronization offset 603 is multiplied 604 with the user awareness parameter. In other words, if the visual information is zoomed in, the user awareness parameter is 1 and the maximum synchronization offset multiplied by the user awareness parameter equals the maximum synchronization offset. However, if the lens angle is wide, the user awareness parameter is 0 and the maximum synchronization offset multiplied by the user awareness parameter equals 0. For example, if the maximum synchronization offset is 10 seconds and the visual information is zoomed in, the delay based on which synchronization is to be performed is 10 seconds. Therefore, audio samples are selected to an audio frame such that the time of capture of the first selected audio sample selected to the audio frame is 10 seconds later than the time of capture associated with a selected video frame. In practise, when the user views the video, there is no delay between the captured audio and the captured visual information. In other words, the captured audio information is synchronized with respect to the captured visual information in dependence upon the user awareness parameter. On the other hand, if the lens angle is wide, the user awareness parameter is 0 and multiplying the maximum synchronization offset with the user awareness parameter equals 0. Therefore, audio samples are selected to an audio frame such that the time of capture of the first selected audio sample corresponds to the time of capture of the selected video frame. In practise, if the distance between the object and the camera is long, also the delay between the audio information and the visual information is long. In other words, the captured audio information is synchronized with respect to the captured visual information based on a time of capture.

In FIG. 6, the synchronized audio information is encoded in an audio encoder 606 and forwarded to a multiplexer 503. The visual information is encoded in a video encoder 605 and forwarded to the multiplexer 503. The multiplexer then combines the encoded audio and video information to provide audio-visual output.

Figure 7:
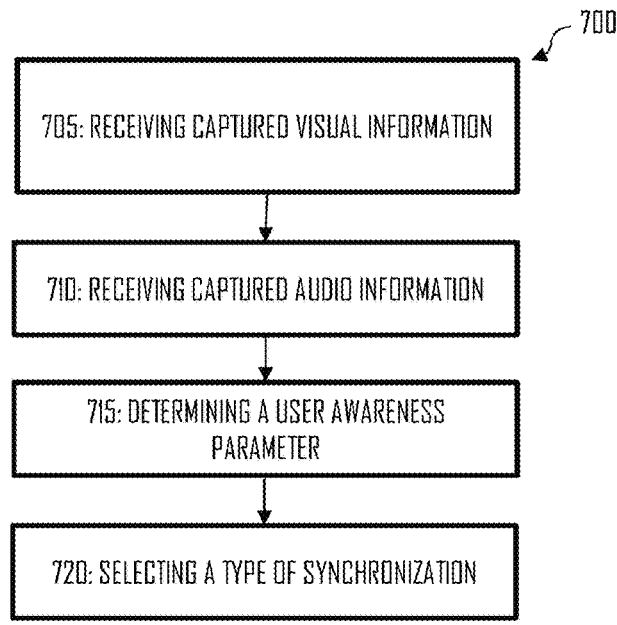
FIG. 7 illustrates an example method incorporating aspects of examples of the invention.

FIG. 7 illustrates an example method 700 incorporating aspects of the previously disclosed embodiments. More specifically the example method 700 illustrates selecting a type of synchronization based on a user awareness parameter.

The method starts with receiving 705 captured visual information and receiving 710 captured visual information. The captured visual information comprises a representation of an object and the captured audio information comprises audio information associated with the object. The method continues with determining 715 a user awareness parameter. The user awareness parameter indicates a level of user comprehension of a context of capturing the visual information and the audio information. The context of capturing may comprise a distance between the object and a capturing device. The method further continues with selecting 720, based on the user awareness parameter, a type of synchronization of the captured audio information with respect to the captured visual information.

Figure 8:
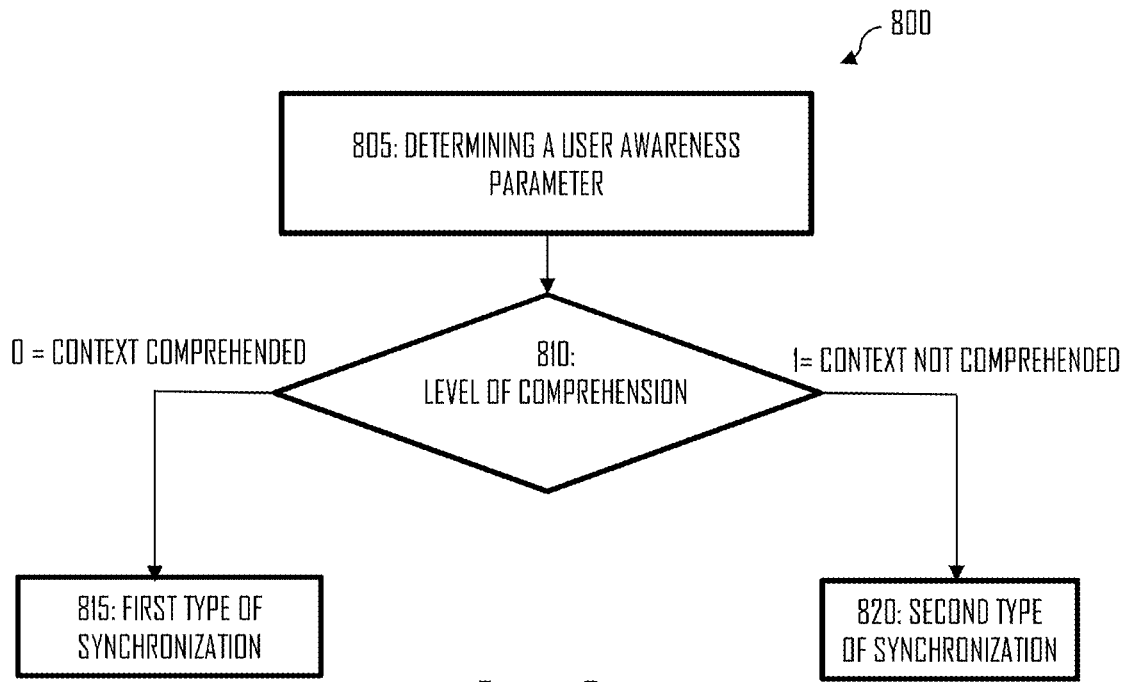
FIG. 8 illustrates another example method incorporating aspects of examples of the invention.

FIG. 8 illustrates another example method 800 incorporating aspects of the previously disclosed embodiments. More specifically the example method 800 illustrates selecting a first type of synchronization or a second type of synchronization based on a user awareness parameter. It is assumed that the captured visual information and the captured audio information are received before the method starts.

The method starts with determining 805 a user awareness parameter. The user awareness parameter indicates a level of user comprehension of a context of capturing the visual information and the audio information. In block 810 it is determined 810 whether the user awareness parameter indicates that the user comprehends the context of capturing the visual information and the audio information. In the example method of FIG. 8, if the user awareness parameter comprises value 0, it is assumed that the user comprehends the context of capturing the visual information and the audio information. Therefore, a first type of synchronization is selected 815. However, if the user awareness parameter comprises value 1, it is assumed that the user does not comprehend the context of capturing the visual information and the audio information. Therefore, a second type of synchronization is selected 820.

Figure 9:
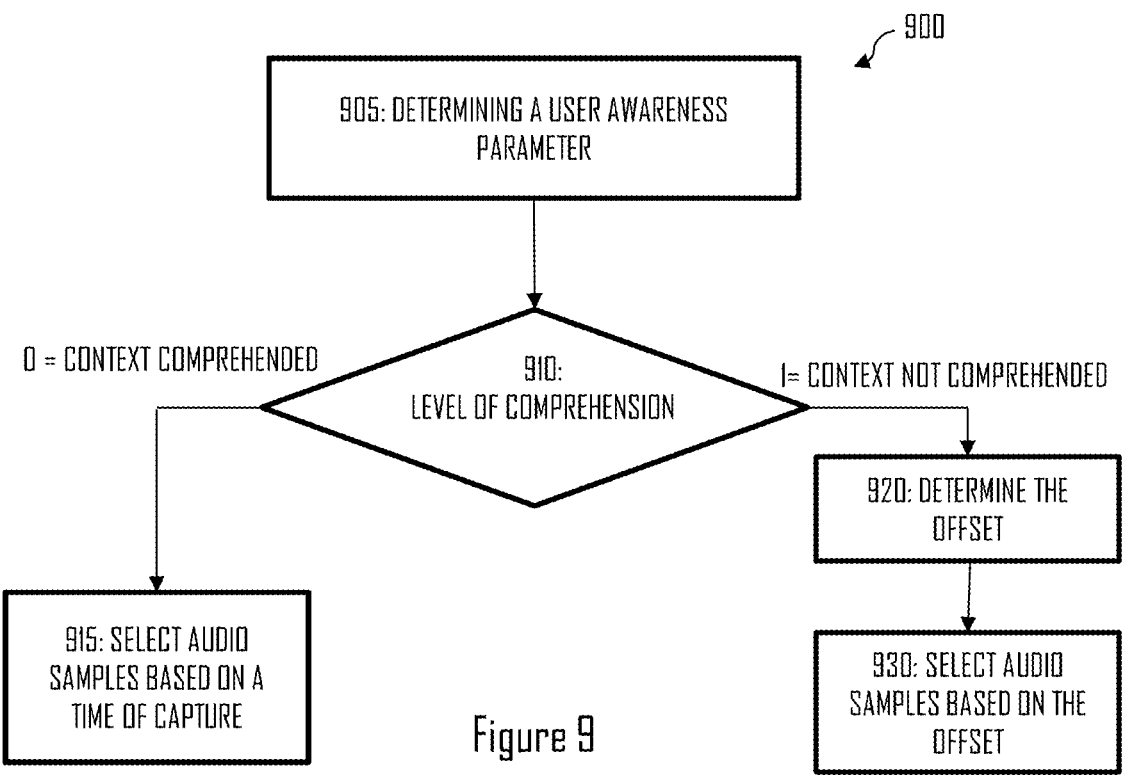
FIG. 9 illustrates a yet further example method incorporating aspects of the examples of the invention.

FIG. 9 illustrates a yet further example method 900 incorporating aspects of the previously disclosed embodiments. More specifically the example method 900 illustrates selecting audio samples to an audio frame based on the user awareness parameter. It is assumed that the captured visual information and the captured audio information are received before the method starts.

The method starts with determining 905 a user awareness parameter. Similarly to FIG. 8, the user awareness parameter indicates a level of user comprehension of a context of capturing the visual information and the audio information. In block 910 it is determined whether the user awareness parameter indicates that the user comprehends the context of capturing the visual information and the audio information. If the user awareness parameter comprises value 0, it is assumed that the user comprehends the context of capturing the visual information and the audio information. Therefore, audio samples are selected to the audio frame based on a time of capture. In other words, a default synchronization is performed. However, if the user awareness parameter comprises value 1, it is assumed that the user does not comprehend the context of capturing the visual information and the audio information. Therefore, a modified synchronization is performed such that an offset between the audio information and visual information is determined 920 and audio samples are selected 930 to the audio frame based on the determined offset. Using the offset a delay between the captured visual information and the captured audio information may be adjusted or removed.

Without limiting the scope of the claims, an advantage of selecting a type of synchronization based on a user awareness parameter is that user experience may be improved. Another advantage is that a user does not need to understand the context of capturing the visual information and the audio information, but the way of presenting the captured visual information and the captured audio information is adapted according to the understanding of the user. A yet further advantage may be that a delay between captured visual information and captured audio information may be adjusted automatically, if the duration of the captured visual information is short.

Without in any way limiting the scope, interpretation, or application of the claims appearing below, a technical effect of one or more of the example embodiments disclosed herein is that different users may be provided with information in a customized manner.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   at least one processor; and
   at least one memory including computer program code,
   the at least one memory and the computer program code configured to, with the at least one processor, cause the apparatus to perform at least the following:
   receive captured visual information comprising a representation of an object;
   receive captured audio information associated with the object;
   determine a user awareness parameter indicating a level of user comprehension of a context of capturing the visual information and the audio information, wherein the determining of the user awareness parameter comprises comparing information related to the capturing of the visual information and the audio information with information related to consuming of the visual information and the audio information; and
   select, based on the user awareness parameter, a type of synchronization of the captured audio information with respect to the captured visual information;
   wherein the selecting of the type of synchronization is based on a handling of a delay between the captured audio information and the captured visual information.

2. The apparatus according to claim 1, wherein the type of synchronization comprises a first type of synchronization or a second type of synchronization.

3. The apparatus according to claim 2, wherein the first type of synchronization comprises synchronizing the captured audio information with respect to the captured visual information based on a time of capture.

4. The apparatus according to claim 2, wherein the second type of synchronization comprises synchronizing the captured audio information with respect to the captured visual information in dependence upon the user awareness parameter.

5. The apparatus according to claim 2, wherein the second type of synchronization comprises synchronizing a detected audio feature with respect to a detected visual feature.

6. The apparatus according to claim 1, wherein the user awareness parameter comprises a numerical value.

7. The apparatus according to claim 1, wherein the context comprises a distance between the object and the apparatus.

8. The apparatus according to claim 1, wherein the user awareness parameter is determined based on one or more of a location of the user, an action involving the user or a capturing parameter.

9. The apparatus according to claim 1, wherein the apparatus further configured to synchronize the captured audio information with respect to the captured visual information according to the selected type of synchronization.

10. The apparatus according to claim 1, wherein the audio information associated with the object comprises audio information caused, created or provided by the object.

11. The apparatus according to claim 1, wherein the apparatus comprises at least one of a camera or a microphone.

12. The apparatus according to claim 1, further configured to determine a distance between the object and the apparatus.

13. A method comprising:
    receiving captured visual information comprising a representation of an object;
    receiving captured audio information associated with the object;
    determining a user awareness parameter indicating a level of user comprehension of a context of capturing the visual information and the audio information, wherein the determining of the user awareness parameter comprises comparing information related to the capturing of the visual information and the audio information with information related to consuming of the visual information and the audio information; and
    selecting, based on the user awareness parameter, a type of synchronization of the captured audio information with respect to the captured visual information;
    wherein selecting the type of synchronization is based on a handling of a delay between the captured audio information and the captured visual information.

14. The method according to claim 13, wherein the type of synchronization comprises a first type of synchronization or a second type of synchronization.

15. The method according to claim 14, wherein the first type of synchronization comprises synchronizing the captured audio information with respect to the captured visual information based on a time of capture.

16. The method according to claim 14, wherein the second type of synchronization comprises synchronizing the captured audio information with respect to the captured visual information in dependence upon the user awareness parameter.

17. The method according to claim 14, wherein the second type of synchronization comprises synchronizing a detected audio feature with respect to a detected visual feature.

18. The method according to claim 13, wherein the user awareness parameter comprises a numerical value.

19. The method according to claim 13, wherein the context comprises a distance between the object and the apparatus.

20. A non-transitory computer readable medium comprising program instructions stored thereon for performing at least the following:
    receive captured visual information comprising a representation of an object;
    receive captured audio information associated with the object;
    determine a user awareness parameter indicating a level of user comprehension of a context of capturing the visual information and the audio information, wherein the determining of the user awareness parameter comprises comparing information related to the capturing of the visual information and the audio information with information related to consuming of the visual information and the audio information; and
    select, based on the user awareness parameter, a type of synchronization of the captured audio information with respect to the captured visual information;
    wherein the selecting of the type of synchronization is based on a handling of a delay between the captured audio information and the captured visual information.

* * * * *